Aug. 31, 1948.                W. J. TURNBULL                2,448,129
                              VEHICLE CONTROL UNIT

Filed June 26, 1945                                    2 Sheets-Sheet 1

*INVENTOR.*
WILLIAM J. TURNBULL
BY
*Donald W. Farrington*
ATTORNEY

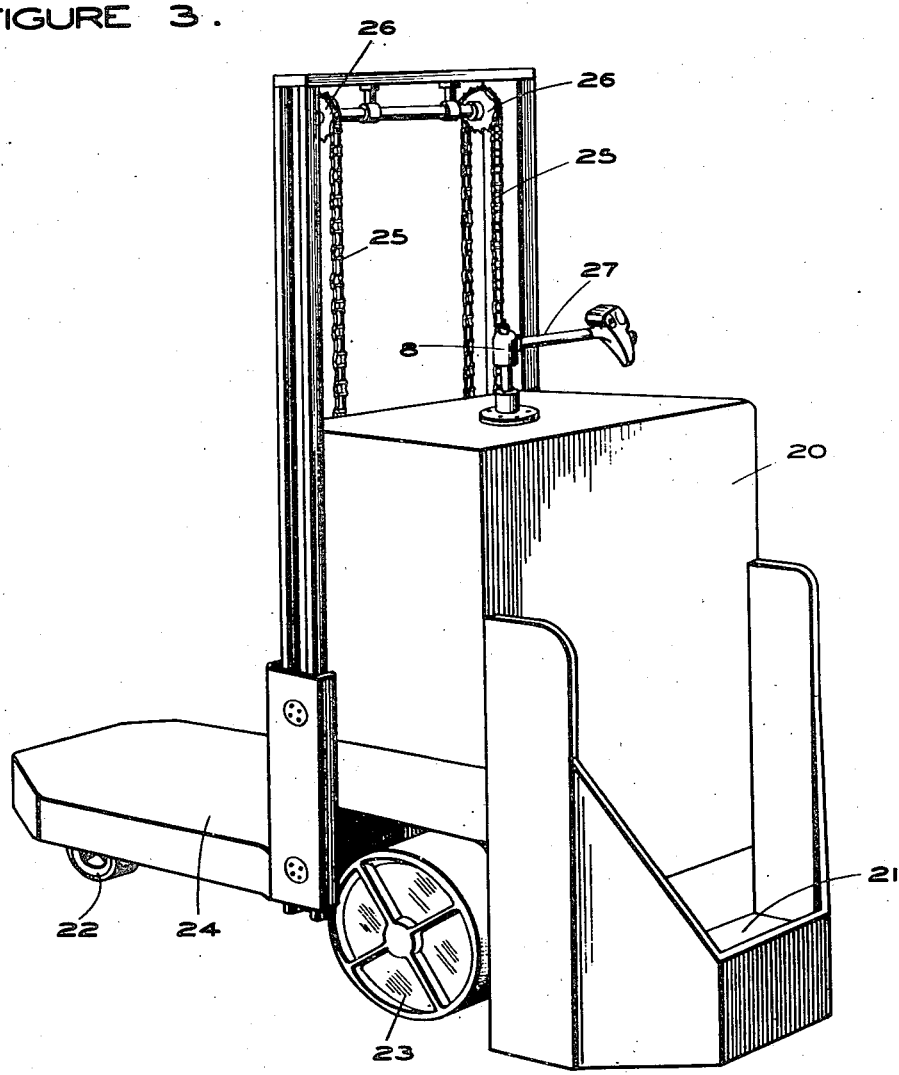

Patented Aug. 31, 1948

2,448,129

UNITED STATES PATENT OFFICE 2,448,129

VEHICLE CONTROL UNIT

William J. Turnbull, Towson, Md., assignor to The Glenn L. Martin Company, Middle River, Md., a corporation of Maryland Application June 26, 1945, Serial No. 601,572

4 Claims. (Cl. 200—157)

This invention relates to a director and control device of general application. It may be used as a director and control device for example on a machine gun turret or as a steering and operating control for any multiple control device such as a hoisting or material handling mechanism.

In the first example, the modern power operated turrets having one or more machine guns, it is desirable to have a unitary control for the system, whether electric or hydraulic, for operating the turrets in azimuth and elevation and firing the guns. Such turrets are usually mounted on an aircraft, but they may be used on speedboats, tanks or other land vehicles. In such installations, the craft or vehicle is very unstable, particularly in aircraft, since the turrets are seldom located at the center of gravity. The aiming and firing of the guns present a very serious problem due to the operator having nothing but the turret and gun controls to brace him particularly in an airplane while the plane is maneuvering at high speed.

In a hoist or material handling device of the self-propelled type, a common design requires that the operator stand on a platform and operate controls which govern the movement, speed and steering of the vehicle. Where the operator stands on the platform it is very desirable to have a unitary control rigidly fixed to the vehicle and centrally located so that the control in the hand of the operator gives him something against which he may steady himself when the vehicle is subject to sudden and jerky movements.

The control of the present invention solves the problem presented by either of the above usages. The operator is afforded a grip whereby he can steady himself with one hand while operating structure on which the control is mounted, with the other.

The control of the present invention not only forms a firm hand rest for the operator, but also incorporates several controls that are so positioned that the operation and steering of the vehicle are effected with a minimum of effort.

The principal object of the present invention is to provide a control consisting of a grip for the left hand of the operator positioned in front of the middle of his body so that he may brace himself on this grip, and a second grip that turns about the first grip for the other hand of the operator to steer and control the vehicle. Each grip is provided with switch controls to operate and control other functions of the vehicle.

Further and other objects will become apparent from the description of the accompanying drawings which form a part of this disclosure and in which like numerals refer to like parts.

In the drawings:

Figure 3 shows an application of the control to an industrial vehicle.

Figure 1:
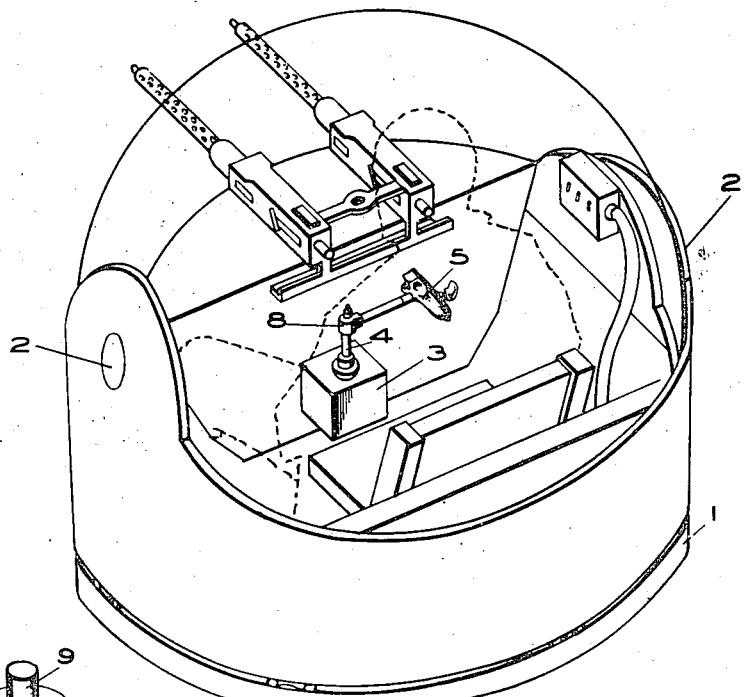
Figure 1 illustrates a ball turret with the control view in place in the turret.

The turret shown in Figure 1 is adapted to turn in azimuth on track 1. The ball turns in elevation and pivots in members 2. The control box contains either the electric or hydraulic controls for the motors which operate the turret in azimuth and elevation. Box 3 upon which the control is mounted, is placed in front of the seat of the turret gunner so that the hands of the gunner when the elbows are held close to the body, fall in a normal natural position so that one hand grasps the top of post assembly 4 and the other hand grasps grip 5. This grip is similar to that of Patent 2,360,818 issued to William J. Turnbull, October 17, 1944. Post 4 and grip 5 are spaced by yoke 6. Flange 7 secures post 4 to control box 3. The enlarged portion 8 on top of post 4 furnishes a grip for the left hand of the gunner. The thumb of the left hand falls in a normal position over button 9 which is the fire control button for the guns, when this control is used on a turret. Grip 5 is mounted on yoke 6 which is adapted to turn about its longitudinal axis. Twisting the hand grip and thereby the yoke, the elevation of the turret is effected through the controls in box 3. By moving yoke 6 in a clockwise or counter clockwise direction and thereby post 4 about its vertical axis, the turret is moved in one direction or the other in azimuth. It will be noted, as the grip 5 is grasped in the right hand, the side of the hand hits member 10 and moves it downwardly over the cam surface 11 to actuate lever 12. This mechanism constitutes a master control switch for the director and fire control unit. As the hand is placed on the grip, the side of the hand moves member 10 and renders the director and control circuits active and functions as a "deadman control." Trigger switch 13 is connected to a suitable mechanism to increase the speed of the elevation or azimuth motors when desired. That is, under normal conditions the motors run at one speed and, if trigger switch is squeezed, the speed is substantially increased. Depression 14 forms a thumb rest so that the grip may be tightly grasped to accomplish a firm control of the turret in elevation. The alternate thumb rest 15, having switch button 16 in the center thereof, is shown to the left of thumb rest 14. This switch button controls the microphone of the interphone circuit.

The location and spacing of the grip from the center post in the turret with respect to the body of the gunner is selected so that when the gunner is in place in the turret he can brace his body by the elbow of his left arm by grasping the grip on post 4. The sole function of the gunner's left arm, apart from fire control, is to act as a brace to steady himself.

The right hand manipulates the grip to train the guns on the target by directing the turret. The thumb of the left hand operates button 9 to control the firing of the guns. The thumb of the left hand is relatively free and can readily be trained to operate the control even though the arm and hand of the operator are employed in steadying the body of the gunner against violent motion of the aircraft. The right hand is thus relieved of the responsibility of fire control, and its primary function is to direct the guns by directing the turret. Trigger 13 is actuated by the index finger of the right hand to increase the speed of the turret when following a target.

Figure 2:
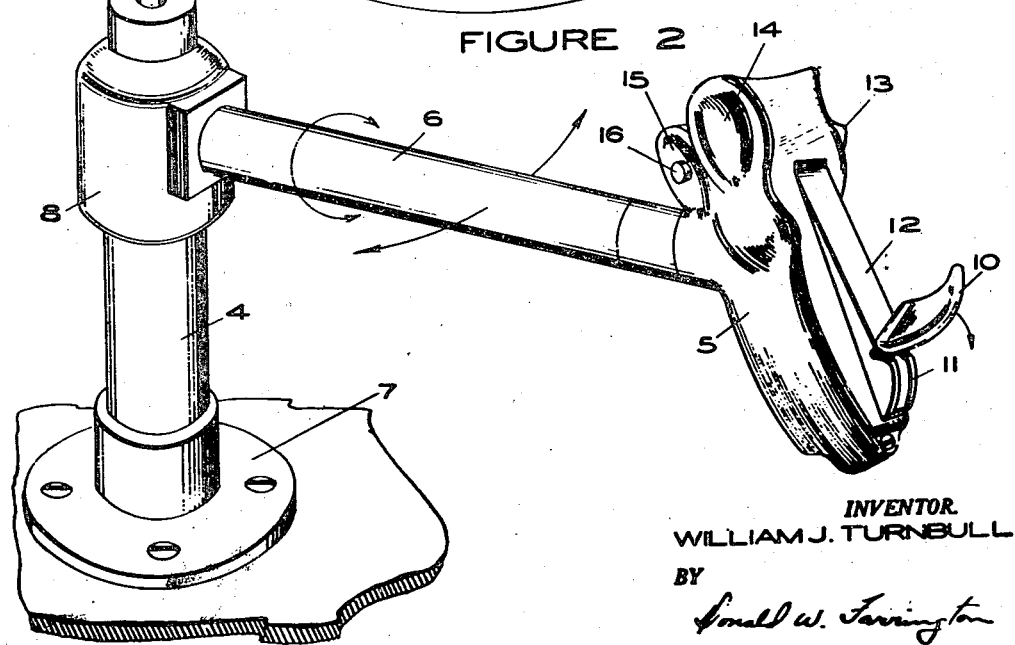
Figure 2 is an enlarged view of the director and control device.

From the foregoing description of the drawings illustrating the invention, the operation and purpose of this device should be obvious. The control of Figure 2 is readily adaptable to any turret having guns that are directed by directing the turret. The control illustrated in Figure 2 need only be positioned with respect to the body of the gunner so that the left and right hands of the gunner fall easily and naturally on grips 8 and 5 respectively. The operating mechanism of the turret can be adapted to conform with the two-motion control of grip 5 for directing the turret in azimuth and elevation with the fire control of the guns operated by a button 9.

The foregoing description of the control is associated with the functions of a gun turret merely for the purpose of showing one use for the control wherein it is imperative to carry out many functions by simple manual manipulations.

The application of the control illustrated in Figure 3 demonstrates its use on an industrial vehicle. The vehicle illustrated is of the type that is self-propelled by electric motors geared to the wheels, run by batteries located in the box 20. The operator stands on platform 21 as the vehicle is moved around on wheels 22 and 23. Platform 24 is adapted to be elevated and lowered by means of chains 25 running over sprockets 26, moved by an electric motor not shown.

The control unit generally indicated as 27 is of the type shown in Figure 2 and is adapted to control all movement and functions of this industrial vehicle. In similar vehicles of this type, the operator's hands are widely spaced apart by controls mounted on the sides of a structure similar to box 20 and foot pedals are also employed to control the many motions involved in a vehicle of this type. When such a vehicle is under way, the operator is liable to be thrown from the vehicle because there is no firm support other than the widely spaced moveable control handles, which afford the only support whereby he may brace himself. By the control unit 27, the operator is afforded one steady hand rest 8 to brace himself. It is centrally located so that by holding his elbow close to his body he can firmly brace himself when traveling over rough pavement or floor. The truck may be readily started, stopped by deadman switch 10, and steered by the control unit described above. A fine control of the elevation and lowering of platform 24 may be had through button 13 and reversing button 9. Button 16 may be used as a horn signal button. In connection with a control on the vehicle of this type, the "deadman" control features embodied in the grip are very valuable as it can control all power supplied to the vehicle. The brakes and release are accomplished by the rotary motion of yoke 6. The brakes are normally locked to prevent rolling and are released by twisting member 6 by the grip in a counter clockwise direction and applied by turning in a clockwise direction.

It is to be understood that certain changes, alterations, modifications and substitutions can be made without departing from the spirit and scope of the appended claims.

I claim as my invention:

1. A directional and control assembly for the manual operation of a multi-control mechanism comprising an upright support securely but pivotally attached to the structure on which the control is mounted, said upright support being of generally cylindrical shape and having a portion adjacent the top thereof affording a grip for one hand of the operator, switch means located on the top of said grip portion for operation by the thumb of the hand of the operator, a member mounted for turning about its longitudinal axis extending laterally from the side of said grip portion, a second grip mounted on the free end of said member for rotating said upright support about the pivotal axis thereof, and for rotating said laterally extending member about the longitudinal axis thereof, switch means in said grip, said grips, switches, and mounting being so constructed and arranged that manipulation of said grips effects multi-directional control of the mechanism.

2. A control handle unit for a vehicle comprising a pair of hand grips, one of said hand grips being generally cylindrical in shape and mounted co-axial with and to turn about a post mounted on the vehicle in an upright position, said post being firmly secured to the vehicle in front of the center line of the body of the operator, a yoke extending generally horizontal from said grip and being mounted for turning about its longitudinal axis, a second hand grip mounted on the end of said yoke to turn therewith, control means on each grip so located as to be readily actuated by the hands of the operator on the grips, for controlling functions of the vehicle.

3. A control unit for the manual operation of a multi-control mechanism comprising an upright support securely but pivotally attached to the structure on which the control is mounted, said upright support being of generally cylindrical shape and having a portion adjacent the top thereof affording a grip for one hand of the operator, said upright support being located in front of the center line of the body of the operator, switch means located on the top of said grip portion for operation by the thumb of the hand of the operator, a member mounted for turning about its longitudinal axis extending laterally from the side of said grip portion, a second grip mounted on the free end of said member for rotating said upright support about the pivotal axis thereof, and for rotating said laterally extending member about the longitudinal axis thereof, switch means in said grip, said grips, switches, and mounting being so constructed and arranged that manipulation of said grips effects multi-directional control of the mechanism.

4. A control unit for the manual operation of a multi-control mechanism on a vehicle comprising an upright support securely attached to the structure on which the control is mounted, a hand grip member mounted on said support to turn about the longitudinal axis of said support, said grip member being of generally cylindrical shape to afford a grip for one hand of the operator, switch means located on the top of said grip portion for operation by the thumb of the hand of the operator, a member mounted for turning about its longitudinal axis and extending laterally from the side of said grip portion, a second grip mounted on the free end of said member for rotating said first grip member about the pivotal axis thereof, and for rotating said laterally extending member about the longitudinal axis thereof, said grips, switches, and mounting being so constructed and arranged that manipulation of said grips effects multi-directional control of the mechanism.

WILLIAM J. TURNBULL.

REFERENCES CITED

The following references are of record in the file of this patent:

UNITED STATES PATENTS

| Number | Name | Date |
| --- | --- | --- |
| 1,142,257 | Huff | June 8, 1915 |
| 2,360,818 | Turnbull | Oct. 17, 1944 |